US011667797B2

(12) United States Patent
Zovi et al.

(10) Patent No.: US 11,667,797 B2
(45) Date of Patent: Jun. 6, 2023

(54) SELF-ADHESIVE COMPOSITION FOR COATING METAL SURFACES

(71) Applicant: Arkema France, Colombes (FR)

(72) Inventors: Ornella Zovi, Le Theil-Nolent (FR); Jean-Charles Durand, Evreux (FR); Jean-Yves Loze, Sant-Victor-de-Chretienville (FR); Emilie-A Delattre, Serquigny (FR)

(73) Assignee: ARKEMA FRANCE, Colombes (FR)

( * ) Notice: Subject to any disclaimer, the term of this patent is extended or adjusted under 35 U.S.C. 154(b) by 265 days.

(21) Appl. No.: 16/344,268

(22) PCT Filed: Oct. 24, 2017

(86) PCT No.: PCT/FR2017/052929
§ 371 (c)(1),
(2) Date: Apr. 23, 2019

(87) PCT Pub. No.: WO2018/078275
PCT Pub. Date: May 3, 2018

(65) Prior Publication Data
US 2019/0264037 A1 Aug. 29, 2019

(30) Foreign Application Priority Data

Oct. 24, 2016 (FR) ...................................... 1660302

(51) Int. Cl.
| | | |
|---|---|---|
| C09D 5/03 | (2006.01) | |
| C09D 7/65 | (2018.01) | |
| C09D 177/00 | (2006.01) | |
| C09D 7/63 | (2018.01) | |
| C08K 3/26 | (2006.01) | |

(52) U.S. Cl.
CPC ............... *C09D 5/033* (2013.01); *C09D 7/63* (2018.01); *C09D 7/65* (2018.01); *C09D 177/00* (2013.01); *C08K 2003/265* (2013.01)

(58) Field of Classification Search
CPC .. C09D 177/00; C09D 177/02; C09D 177/04; C09D 177/06; C09D 177/08; C09D 177/10; C09D 177/12; C09D 7/00; C09D 7/40; C09D 7/41; C09D 7/45; C09D 7/47; C09D 7/65; C09D 7/66; C09D 7/67; C09D 7/68; C09D 7/69; C09D 7/70; C09D 5/00; C09D 5/002; C09D 5/03; C09D 5/031; C09D 5/032; C09D 5/33; C09D 5/034; C09D 5/035; C09D 5/036; C09D 5/037; C09D 5/038; C09D 5/08; C09D 5/082; C09D 5/084; C09D 5/086; C09D 5/088; C09D 5/16; C09D 5/1606; C09D 5/1612; C09D 5/1618; C09D 5/1625; C09D 5/1631; C09D 5/1637; C09D 5/1643; C09D 5/165; C09D 5/1656; C09D 5/1662; C09D 5/1668; C09D 5/1675; C09D 5/1681; C09D 5/1687; C09D 5/1693; C09J 177/00; C09J 177/02; C09J 177/04; C09J 177/06; C09J 177/08; C09J 177/10; C09J 177/12; C09J 7/00; C09J 7/10; C09J 7/20; C09J 7/201; C09J 7/203; C09J 7/205; C09J 7/22; C09J 7/25; C09J 7/255; C09J 7/26; C09J 7/29; C09J 7/30; C09J 7/32; C09J 7/35; C09J 7/38; C08K 2003/262; C08K 2003/265; C08K 2003/267; C08L 77/00; C08L 77/02; C08L 77/04; C08L 77/06; C08L 77/08; C08L 77/10; C08L 77/12
See application file for complete search history.

(56) References Cited

U.S. PATENT DOCUMENTS

| | | | |
|---|---|---|---|
| 5,830,975 A * | 11/1998 | Perraud ................ | C09D 177/02 528/170 |
| 6,027,814 A | 2/2000 | Julien et al. | |
| 2005/0176866 A1 | 8/2005 | Krendlinger et al. | |
| 2010/0113670 A1* | 5/2010 | Audenaert ............... | C09D 5/03 524/425 |
| 2011/0150802 A1 | 6/2011 | Bui et al. | |
| 2012/0070670 A1 | 3/2012 | Pawlik et al. | |

FOREIGN PATENT DOCUMENTS

| | | | | |
|---|---|---|---|---|
| AU | 28776/97 A | 1/1998 | | |
| CN | 1177367 A | 3/1998 | | |
| CN | 105524536 A | 4/2016 | | |
| EP | 0821039 A1 | 1/1998 | | |
| EP | 0969053 A1 * | 1/2000 | ........... | C09D 177/06 |
| FR | 2905700 A1 | 3/2008 | | |
| JP | H10-077453 A | 3/1998 | | |
| JP | H10-511725 A | 11/1998 | | |
| JP | 2010-502805 A | 1/2010 | | |
| JP | 2011-126885 A | 6/2011 | | |
| WO | 96/20979 A1 | 7/1996 | | |
| WO | 2008029070 A1 | 3/2008 | | |
| WO | 2010015785 A1 | 2/2010 | | |

OTHER PUBLICATIONS

Platamid Hot Melt Adhesives, downloaded Apr. 9, 2021. (Year: 2021).*
EP0969053A1 English machine translation, prepared Apr. 9, 2021. (Year: 2021).*
International Search Report (PCT/ISA/210) dated Jan. 31, 2018, by the European Patent Office as the International Searching Authority for International Application No. PCT/FR2017/052929.
Written Opinion (PCT/ISA/237) dated Jan. 31, 2018, by the European Patent Office as the International Searching Authority for International Application No. PCT/FR2017/052929.
(Continued)

*Primary Examiner* — Christopher M Rodd
(74) *Attorney, Agent, or Firm* — Buchanan Ingersoll & Rooney P.C.

(57) ABSTRACT

The present invention relates to a self-adhesive powder composition comprising:
at least one polyamide;
at least one ethylene vinyl alcohol copolymer;
at least one hydrophobic agent; and
optionally at least one filler.

13 Claims, No Drawings

(56) References Cited

OTHER PUBLICATIONS

Office Action (The First Office Action) dated Oct. 21, 2020, by the National Intellectual Property Adminisliation, PRC in corresponding Chinese Patent Application No. 201780065861.X, English Translation only. (12 pages).
Office Action (Notice of Reasons for Rejection) dated May 17, 2021, by the Japanese Patent Office in corresponding Japanese Patent Application No. 2019-522267, and an English Translation of the Office Action. (10 pages).
Office Action (Notification of the First Office Action) dated Apr. 21, 2021 by the China National Intellectual Property Administration of the People's Republic of China in corresponding Chinese Patent Application No. 201780065861.X, and an English Translation of the Office Action. (16 pages).

* cited by examiner

SELF-ADHESIVE COMPOSITION FOR COATING METAL SURFACES

FIELD OF INVENTION

The invention relates to a polyamide-based, self-adhesive powder composition for coating metal surfaces.

BACKGROUND AND RELATED ART

Coating metal surfaces is very widespread in industry and has a great variety of applications, particularly in the automotive and fluid transfer fields and in the electrical and electronics industries. The adhesion of a coating to these supports is fundamental to their mechanical performance and protection against corrosion.

Polyamides are commonly used for coating metal surfaces. In order to ensure durable adhesion of the polyamide coating on the metal support, the support is first coated with an undercoat called an adhesion primer. However, this requires additional facilities, increases the duration of the coating operations and increases production costs.

Alternatives have therefore been sought for coating metal surfaces using polyamide-based compositions that do not require adhesion primers.

Patent application US 2012/0070670 thus describes the coating of metal parts with a composition comprising a copolyamide, an isocyanate, an epoxide and a functionalized polyolefin.

However, in some cases, particularly for water lines, it is desirable to avoid the use of isocyanate or epoxide compounds, particularly bisphenol A.

Within this context, international application WO2008/029070 describes a polyamide-based, self-adhesive powder composition for coating metal surfaces, which does not require a primer. In this case, adhesion is obtained by means of a coating having a dry and/or wet modulus greater than or equal to 2200 MPa [standard NF EN ISO 527], with this modulus being achieved by the use of a large quantity of fillers in the composition. However, this high rate of fillers makes the coating brittle when dry.

Thus, one of the aims of the present application is to provide a polyamide-based composition for coating metal surfaces which is devoid of these shortcomings.

SUMMARY OF THE INVENTION

The present invention results from the unexpected finding by the inventors that the addition of a hydrophobing agent, combined with an adhesion promoter such as an ethylene vinyl alcohol copolymer, to a polyamide-based powder composition comprising no epoxide and having a moderate filler content, made it possible to obtain a metal surface coating with excellent adhesion and good flexibility before and after immersion in water at 50° C., for several weeks without any changes in the appearance of the coating.

Thus, the present invention relates to a self-adhesive powder composition comprising:
- at least one polyamide;
- at least one ethylene vinyl alcohol copolymer;
- at least one hydrophobing agent; and
- optionally at least one filler.

Advantageously, the self-adhesive powder composition comprises:
- 55 to 99% of at least one polyamide, and
- 0.5 to 23% of at least one ethylene vinyl alcohol copolymer, and
- 0.5 to 22% of at least one hydrophobing agent, by weight, for the total weight of the composition.

In one preferred embodiment, the composition according to the invention comprises:
- at least one homopolyamide and/or one copolyamide;
- at least one ethylene vinyl alcohol copolymer;
- at least one hydrophobing agent; and
- optionally at least one filler.

In another preferred embodiment, the composition according to the invention comprises:
- at least one homopolyamide and optionally at least one copolyamide;
- at least one ethylene vinyl alcohol copolymer;
- at least one hydrophobing agent; and
- optionally at least one filler.

Preferably, the composition according to the invention comprises:
- at least one homopolyamide;
- at least one copolyamide;
- at least one ethylene vinyl alcohol copolymer;
- at least one hydrophobing agent, and
- optionally at least one filler.

The composition according to the invention advantageously comprises:
- 55 to 98.5%, preferably 65 to 84%, of at least one homopolyamide and/or copolyamide with melting point above 150° C., and
- 0.5 to 15%, preferably 2 to 10%, of at least one ethylene vinyl alcohol copolymer, and
- 0.5 to 15%, preferably 2 to 10%, of at least one hydrophobing agent, and
- 0.5 to 15%, preferably 2 to 15%, of at least one copolyamide with melting point within the range of 80 to 150° C., by weight, for the total weight of the composition.

Two types of copolyamides are differentiated here:
- those used as additives at a content ranging from 0.5 to 15% and a melting point within the range of 80 to 150° C.;
- those used, where applicable, as base polyamides (PA) of the composition, said composition according to the invention containing 55 to 98.5% of homopolyamide and/or copolyamide PAs, and said copolyamide, when present in said base PA, having a melting point greater than 150° C.

In the present description, the melting temperature or melting point (MP) of the copolyamide is measured according to standard ISO 11357-3 Plastics—Differential scanning calorimetry (DSC) Part 3.

Advantageously, the composition comprises less than 20% weight of filler, preferably comprising between 0.01 to 12% weight, preferably from 3 to 8% weight, of filler for the total weight of the composition, in which the filler is preferably calcium carbonate.

In another preferred embodiment, the composition according to the invention does not include an epoxide compound.

The present invention also relates to the use of a composition as defined above for coating a metal surface.

In a preferred embodiment of the use according to the invention, the metal surface has not been previously coated with an adhesion primer.

The present invention also relates to a process for coating a metal surface, comprising a step of contacting a metal surface with a composition as described above.

In a preferred embodiment, the coating process according to the invention comprises the following steps:
heating the metal surface to a temperature that is high enough for the composition to melt on contact;

dipping the metal surface into a fluidised bed comprising the composition.

In another preferred embodiment, the coating process according to the invention comprises the following steps:
electrically charging the composition;
spraying the composition onto the metal surface, with the metal surface being connected to a zero potential;
heating the powder-coated metal surface to a temperature that is high enough to melt the composition.

In yet another preferred embodiment, the coating process according to the invention comprises the following steps:
heating the metal surface to a temperature that is high enough for the composition to melt on contact;
spraying the composition onto the metal surface.

In a particularly preferred embodiment, the coating process according to the invention does not include a step in which a coat of adhesion primer is applied to the metal surface prior to contact with the composition.

The present invention also relates to a material comprising a metal surface, the metal surface being coated with a coating obtained by melting a composition as defined above.

The present invention also relates to a process for manufacturing a composition as defined above, comprising the following steps:
mixing the constituents of the composition while molten;
milling the mixture after solidification to obtain a powder of particles.

DETAILED DESCRIPTION OF THE INVENTION

Firstly, as used herein, the term "comprising" means "including," "containing" or "encompassing," i.e., when an object "comprises" one or more elements, elements other than those mentioned can also be included in the object. Conversely, the expression "consisting of" means "composed of," i.e. when an object "consists of" one or more elements, the object cannot include elements other than those mentioned.

Polyamide

The term "polyamide" (PA) as used herein denotes any condensation product of lactam(s), amino acid(s) or diacid(s) and diamine(s) and, as a general rule, any polymer formed by units bonded by amide functions. Polyamides are well known to the person skilled in the art. The polyamide according to the invention can be a homopolyamide and/or a copolyamide (CoPA). In the case where the polyamide comprises at least two different monomers, it forms a copolyamide. The term "monomer" in the present description of polyamides is to be understood to mean "repeating unit." Indeed, the case in which a repeating unit of the PA consists of the association of a diacid with a diamine is a particular one. The combination of a diamine and a diacid, i.e., the diamine-diacid pair (in equimolar amount), is considered to correspond to the monomer. This is explained by the fact that individually, the diacid or the diamine is only a structural unit, which alone is not enough to polymerise.

Advantageously, said polyamide powder comprises at least one monomer chosen from amino carboxylic acids, preferably alpha,omega-aminocarboxylic acids, comprising from 4 to 18 carbon atoms, diamine-diacid pairs comprising from 4 to 36 carbon atoms, lactams comprising from 3 to 18 carbon atoms, and mixtures thereof.

According to a preferred embodiment of the invention, said polyamide-based particles comprise at least one polyamide and/or at least one copolyamide and/or mixtures thereof.

"Copolyamide" (abbreviated as CoPA) denotes the polymerisation products of at least two different monomers chosen from:
monomers such as amino acids or amino carboxylic acids, and preferably alpha, omega-aminocarboxylic acids;
monomers such as lactams having 3 to 18 carbon atoms on the main ring and which can be substituted;
monomers such as "diamine-diacid" produced from the reaction between an aliphatic diamine having from 4 to 36 carbon atoms, preferably from 4 to 18 carbon atoms and a carboxylic diacid having from 4 to 36 carbon atoms, preferably from 4 to 18 carbon atoms; and
mixtures thereof, with monomers of a different number of carbon atoms in the case of mixtures between an amino acid type monomer and a lactam type monomer.

Amino Acid Type Monomers:

Examples of alpha,omega-amino acids can include those having from 4 to 18 carbon atoms, such as aminocaproic acid, 7-aminoheptanoic acid, 11-aminoundecanoic acid, N-heptyl-11-aminoundecanoic acid and 12-aminododecanoic acid.

Lactam Type Monomers:

Examples of lactams can include those having 3 to 18 carbon atoms on the main ring and which can be substituted. Examples are β,β-dimethylpropriolactam, α,α-dimethylpropriolactam, amylolactam, caprolactam also called lactam 6, capryllactam also called lactam 8, enantholactame and lauryllactam also called lactam 12.

"Diamine-Dacid" Type Monomers

Examples of dicarboxylic acid can include acid having from 4 to 36 carbon atoms. Examples can include adipic acid, sebacic acid, azelaic acid, suberic acid, isophthalic acid, butanedioic acid, 1,4 cyclohexyldicarboxylic acid, terephthalic acid, sulfoisophthalic acid sodium or lithium salt, dimerised fatty acids (these dimerized fatty acids have a dimer content of at least 98% and are preferably hydrogenated) and dodecanedioic acid HOOC—(CH2)10-COOH, and tetradecanedioic acid.

More particularly, fatty acid dimers or dimerized fatty acids are understood as the product of the dimerization reaction of fatty acids (generally containing 18 carbon atoms, often a mixture of oleic acid and/or linoleic acid). This preferably involves a mixture comprising from 0 to 15% C18 monoacids, from 60 to 99% C36 diacids, and from 0.2 to 35% C54 or more triacids or polyacids.

Examples of diamine can include aliphatic diamines having from 4 to 36 atoms, preferably from 4 to 18 atoms, which can be arylic and/or saturated cyclic. Examples can include hexamethylenediamine, piperazine (abbreviated "Pip"), aminoethylenepiperazine, tetramethylenediamine, octamethylene diamine, decamethylene diamine, dodecamethylene diamine, 1,5 diaminohexane, 2,2,4-trimethyl-1,6-hexanediamine, diamine polyols, isophorone diamine (IPD), methylpentamethylene diamine (MPMD), bis(aminocyclohexyl)methane (BACM), bis(3-methyl-4 aminocyclohexyl) methane (BMACM), methaxylyenediamine, and bis(p aminocyclohexyl)methane.

Examples of diamines-diacids can include more particularly those resulting from the condensation of 1,6-hexamethylenediamine with a carboxylic diacid having from 6 to 36 carbon atoms and those resulting from the condensation of 1,10-decamethylene diamine with a diacid having from 6 to 36 carbon atoms.

Examples of "diamine-diacid" type of monomers can include in particular the monomers: 6.6, 6.10, 6.11, 6.12, 6.14, 6.18. This can include monomers resulting from the condensation of decanediamine with a diacid C6 to C36, particularly the monomers: 10.10, 10.12, 10.14, 10.18.

Preferably, the polyamide powders of the invention comprise at least one polyamide chosen from polyamides and copolyamides comprising at least one of the following monomers: 4.6, 4.T, 5.6, 5.9, 5.10, 5.12, 5.13, 5.14, 5.16, 5.18, 5.36, 6, 6.6, 6.9, 6.10, 6.12, 6.13, 6.14, 6.16, 6.18, 6.36, 6.T, 9, 10.6, 10.9, 10.10, 10.12, 10.13, 10.14, 10.16, 10.18, 10.36, 10.T, 11, 12, 12.6, 12.9, 12.10, 12.12, 12.13, 12.14, 12.16, 12.18, 12.36, 12.T, and mixtures thereof; in particular chosen from PA 11, PA 12, PA 10.10, PA 6, PA 6.10, PA 10.12, PA 6.14 and/or PA 6.6/6, PA 6/12, PA 11/10.10, and mixtures thereof.

Preferably, the PA X.Y or PA diamine-diacid type polyamide according to the invention is selected in the group resulting from the condensation between on the one hand (for X) hexamethylenediamine and/or decanediamine and/or dodecanediamine, and on the other hand (for Y) hexamethylenediacid and/or sebacic acid and/or dodecanedioic acid.

Preferably, the composition according to the invention comprises at least one homopolyamide selected from the group composed of PA 10.10, PA11 and PA12.

P10, PA11 and PA12 are well known to the person skilled in the art.

The PA10.10 according to the invention results in particular from the condensation of decanediamine with sebacic acid, a natural fatty acid obtained from castor oil Examples of PA 10.10 according to the invention available on the market, can include products of the Hiprolon® brand from the Arkema Company, such as Hiprolon® 200.

The PA 11 according to the invention is a polyundecanamide resulting in particular from the condensation of 11-aminoundecanoic acid, an amino acid from castor oil. Examples of PA 11 according to the invention, can include products of the Rilsan® brand from the Arkema company, such as Rilsan® PA 11 BMNO and Rilsan® PA 11 BMFO.

The PA 12 according to the invention is a polylauramide resulting in particular from the condensation of lactam 12 or lauryllactam. By way of example of PA 12 according to the invention, the Rilsamid® brand and Rilsan® line of products from the Arkema company can be cited.

Examples of copolyamides formed from different types of monomers described above, can include copolyamides resulting from the condensation of at least two alpha,omega-aminocarboxylic acids or two lactams or one lactam and an alpha,omega-aminocarboxylic acid. Copolyamides can also be cited, resulting from the condensation of at least one alpha,omega-aminocarboxylic acid (or a lactam), at least one diamine and at least one dicarboxylic acid. Copolyamides can also be cited, resulting from the condensation of an aliphatic diamine with an aliphatic carboxylic diacid and at least one other monomer chosen from aliphatic diamines other than the preceding one and aliphatic diacids different from the preceding one.

Examples of copolyamides can include copolymers of caprolactam and lauryllactam (PA 6/12), copolymers of caprolactam, hexamethylene diamine and adipic acid (PA 6/6.6), copolymers of caprolactam, of lauryllactam, of hexamethylene diamine and of adipic acid (PA 6/12/6.6), copolymers of caprolactam, of hexamethylene diamine et azelaic acid, 11-aminoundecanoic acid, and of lauryllactam, (PA 6/6.9/11/12), copolymers of caprolactam, adipic acid and of hexamethylene diamine, 11-aminoundecanoic acid, of lauryllactam (PA 6/6.6/11/12), copolymers of hexamethylene diamine, azelaic acid, and of lauryllactam (PA 6.9/12), copolymers of caprolactam and 11-aminoundecanoic acid (PA 6/11), copolymers of lauryllactam and of capryllactam (PA 12/8), copolymers of capryllactam and of caprolactam (PA 8/6), copolymers of lauryllactam and of capryllactam (PA 12/8), copolymers of lauryllactam and of 11-aminoundecanoic acid (PA 12/11).

Advantageously one or more of the following copolyamides can be used in the composition or the process of the present invention:

PA 6/6.6/12, of which the respective mass ratios in monomers can be (in percentage): 40/20/40, 35/20/45, 45/35/20, 30/30/40, 22/18/60, 40/25/35;

PA 6/6.6/11/12, of which the respective mass ratios in monomers can be (in percentage): 30/15/10/45, 30/20/20/30, or 15/25/25/35;

PA 6/12 with mass ratio of 70/30;

PA 6.9/12 with mass ratio of 30/70;

PA Pip.9/Pip.12/11 with mass ratio of 15/70/15;

PA 6/IPD.6/12 with mass ratio of 20/15/65;

PA IPD.9/12 with mass ratio of 20/80;

PA6/MPMD.12/12 with mass ratio of 27/33/33;

PA 6/6.12/12 with mass ratio of 30/30/40;

PA 6/Pip.12/12 with mass ratio of 30/20/50;

PA 6/6.12/11/PEG.12 with mass ratio of 25/21/25/30;

PA 6.10/11/PEG.10 with mass ratio of 14/14/42/30;

PA 6/6.6/6.10/6.1 with mass ratio of 40/10/40/10;

PA 6.10/Pip.10/Pip.12 with mass ratio of 20/40/40;

PA 6/11/12 with mass ratio of 10/36/54;

PA Pip.12/12 with mass ratio of 35/65;

PA IPD.10/12 with mass ratio of 80/20;

PA Pip.10/12 with mass ratio of 72/28;

PA 6/11 with mass ratio of 50/50;

PA Pip.10/11/Pip.9 with mass ratio of 65/30/5;

PA 6/6.6/6.10 with mass ratio of 35/30/35

Examples of copolyamides can include those marketed under the name Platamid® and Platamid® Rnew by ARKEMA, Vestamelt® by Evonik, and Griltex® by EMS.

Preferably the polyamide used in the present invention comprises at least one copolyamide chosen from: PA 6/6.6/12, PA 6/6.6/11/12, PA 6/12, PA 6.9/12, PA Pip.9/Pip.12/11, PA 6/IPD.6/12, PA IPD.9/12, PA6/MPMD.12/12, PA 6/6.12/12, PA 6/Pip.12/12, PA 6/6.6/6.10/6.1, PA 6.10/Pip.10/Pip.12, PA 6/11/12, PA Pip.12/12, PA IPD.10/12, PA Pip.10/12, PA 6/11, PA Pip.10/11/Pip.9, PA 6/6.6/6.10, and in particular those with the mass ratios as defined above, and mixtures of said copolyamides.

The melting point of the CoPAs preferred as additives of the composition according to the invention is generally within the range of 80 to 150° C., preferably from 100 to 130° C.

Composition

The expression "self-adhesive powder composition" according to the invention denotes a composition in the form of powder particles that can adhere to a surface without the use of additional compounds.

As understood here, the ethylene vinyl alcohol (EVOH) copolymer results from the condensation of polyethylene and polyvinyl alcohol. The ethylene vinyl alcohol copolymer according to the invention is used in particular to promote adhesion. Examples of an ethylene vinyl alcohol copolymer according to the invention, can include the Evasin products produced by Arkema, such as Evasin 3251F and Evasin 4405F.

The hydrophobing agent according to the invention can be any of the types known to the person skilled in the art. Preferably the hydrophobing agent is a wax, in particular selected from the group composed of polyethylene and/or polypropylene and/or ethylene bis stearamide waxes. Examples of a hydrophobing agent according to the invention can include those of the Ceridust brand (Clariant) or those of the Crayvallac (Arkema) brand.

In a preferred embodiment, the composition according to the invention comprises at least one filler.

The filler according to the invention can be any type suitable for the preparation of polyamide-based compositions. However, it is preferred that the filler be selected from the group composed of talc, calcium carbonates, manganese carbonates, potassium silicates, aluminum silicates, dolomite, magnesium carbonates, quartz, boron nitride, kaolin, wollastonite, titanium dioxide, glass or mica beads, carbon black, quartz, mica and chloride mixtures, feldspar, and dispersed nanometric fillers such as carbon and silica nanotubes. The particularly preferred filler according to the invention is calcium carbonate.

Moreover, it is also preferred that the composition according to the invention comprise less than 30% weight, more preferably less than 20% weight, and still more preferably less than 10% weight of filler, said filler preferably being composed of calcium carbonate.

Preferably, the composition according to the invention further comprises at least one additional agent selected from the group composed of a pigment, a dye, an anti-cratering and/or anti-spreading agent, a reducing agent, an antioxidant, a UV stabilizer, a fluidising agent and a corrosion inhibitor.

The pigment according to the invention can be any type known to the person skilled in the art. Preferably, the pigment according to the invention is selected from the group composed of titanium dioxide, carbon black, cobalt oxide, nickel titanate, molybdenum disulphide, aluminium flakes, iron oxide, zinc oxide, organic pigments such as those derived from phthalocyanine and anthraquinone, and zinc phosphate.

The dye according to the invention can be any type known to the person skilled in the art. Preferably, the dye according to the invention is selected from the group composed of azoic dyes, anthraquinonic dyes, dyes derived from indigo, triarylmethane dyes, chlorine dyes and polymethine dyes.

The anti-cratering and/or and anti-spreading agent can be any type known to the person skilled in the art Preferably, the anti-cratering and/or anti-spreading agent according to the invention is selected from the group composed of derivatives of polyacrylates.

The UV stabilizer according to the invention can be any type known to the person skilled in the art. Preferably, the UV stabilizer according to the invention is selected from the group composed of derivatives of resorcin, benzotriazoles, phenyltriazine and salicylates.

The antioxidants according to the invention can be any type known to the person skilled in the art. Preferably, the antioxidants according to the invention are selected from the group composed of copper iodide combined with potassium iodide, derivatives of phenol and hindered amines.

The fluidising agent according to the invention can be any type known to the person skilled in the art. Preferably, the fluidising agent is selected from the group composed of aluminas and silicas.

The corrosion inhibitors according to the invention can be any type known to the person skilled in the art. Preferably, the corrosion inhibitors according to the invention are selected from the group composed of phosphosilicates and borosilicates.

The powder particles of the composition can have a spherical, spheroidal or non-spherical shape.

Preferably, the particle size of the powder composition according to the invention is between 5 μm and 1 mm, more preferably between 10 and 800 μm, and still more preferably between 80 and 200 μm. The term "particle size" as used herein denotes the average diameter or D50 of the powder particles of the composition. Within the scope of this description, the term "diameter" is used to describe the diameter of the circumscribed circle of the particles. D50 corresponds to the value of the particle size which divides the population of particles examined exactly in two. In other words, 50% of the particles have a size smaller than D50. The D50 is measured according to standard ISO 9276—Parts 1 to 6. "Representation of data obtained by granulometric analysis." In the present description, a laser granulometer is used (for example such as Malvern) to obtain the granulometric distribution of the powder and to deduce the D50 therefrom.

Furthermore, throughout this description the expression "is between" designates an interval inclusive of the specified limits.

Process for Manufacturing the Composition

The composition is preferably produced by mixing molten constituents, particularly in a pug mill, then milling the mixture after the solidification thereof. The powder particles of the composition thus formed having the desired particle size can then be selected.

Preferably, powder particles are selected that have a particle size between 5 μm and 1 mm, more preferably between 10 and 800 μm and yet more preferably between 80 and 200 μm.

Preferably, the temperature of the mixing step is between 150° C. and 300° C., more preferably between 180° C. and 270° C.

The milling according to the invention can be achieved by any means. Preferably, the milling according to the invention is selected from the group composed of a hammer mill, crushing knives, grinding disc, air jet milling and cryogenic milling.

Coating

The composition according to the invention is preferentially used for coating metal surfaces.

The composition according to the invention can be applied to or contacted with a metal surface using numerous coating techniques that are well known to the person skilled in the art. Preferably, the coating according to the invention is performed using a method selected from the group composed of fluid bed dip coating, electrostatic spray coating and stoved powder coating.

Fluid bed dip coating is well known to the person skilled in the art. Preferably, the metal surface to be coated is preheated to a temperature enabling the composition according to the invention to melt. The metal surface is then immersed in a fluid bed comprising a composition according to the invention. The composition according to the invention melts on contact with the object and forms a coating on it. The coated object is then cooled in ambient air.

Preferably, the particle size of the composition in fluid bed dip coating is between 10 and 1000 µm, and preferably between 80 and 200 µm.

Preferably, the fluidised air for the fluidisation of the composition is cold, clean and oil-free.

Preferably, the heating temperature of the metal surface is between 200 and 500° C., and preferably between 300 and 400° C.

Preferably, the dipping time of the metal surface in the fluidised bed is between 1 and 10 seconds, more preferably between 3 and 5 seconds.

Preferably, the thickness of the coating obtained by fluid bed dipping is between 150 and 1000 µm, and preferably between 200 and 700 µm. The person skilled in the art will understand that a thicker coating may be obtained by increasing the dipping time or by performing several successive dips in the fluidised bed.

Electrostatic spray coating is well known to the person skilled in the art. Electrostatic spray coating consists of depositing powder particles of the composition according to the invention that are electrostatically charged onto a metal surface, particularly at ambient temperature. The composition according to the invention can be electrostatically charged as it passes through the nozzle of the spraying equipment. The composition thus charged can then be sprayed onto the object comprising the metal surface to be coated, which is connected to a zero potential. The coated object can then be placed in an oven at a temperature enabling the composition to melt.

The equipment enabling the composition according to the invention to be sprayed can be of any type. Preferably, the nozzle is set at a high potential of between about 10 and about 100 kV, of negative or positive polarity. Preferably, the equipment enabling the composition according to the invention to be sprayed is an electrostatic pistol that charges the composition according to the invention by Corona and/or triboelectric effect.

Preferably, the particle size of the composition in electrostatic spray coating is between 5 and 100 µm, and preferably between 5 and 65 µm.

Preferably, the flow rate of the powder in the spraying equipment is between 10 and 200 g/min, and more preferably between 50 and 120 g/min.

Preferably, the electrostatic application temperature of the powder is between 15 and 25° C.

Preferably, the holding time of the metal part in the oven is between 3 and 15 minutes.

Preferably, the melting temperature is between 200° C. and 250° C., more preferably between 210° C. and 220° C.

The thickness of the coating obtained is between 50 and 200 µm, and more preferably between 80 and 150 µm.

As is well known, stoved powder coating generally comprises a step in which the composition according to the invention is sprayed onto a metal surface preheated to a temperature enabling the composition to melt. The part can then be cooled to ambient temperature.

The thickness of the coating obtained by stoved powder coating is preferably between 200 and 1000 µm, and preferably between 200 and 700 µm.

The powder composition for stoved powder coating can be electrostatically charged or not.

The metal surface to be coated according to the invention can be of any type. Preferably, the metal surface according to the invention is selected from the group composed of ordinary or galvanized steel parts, aluminium parts, or aluminium alloy parts. The metal surface in ordinary steel, aluminium or aluminium alloy may have undergone one or more surface treatments that are well known to the person skilled in the art and selected from the group composed of rough degreasing, alkaline degreasing, scrubbing, shot peening or sandblasting, fine degreasing, hot rinse, phosphate degreasing, iron/zinc/tri-cation phosphating, chromating, cold rinse and chrome rinse.

Preferably, the metal surface to be coated according to the invention is selected from the group composed of degreased, smooth or shot-peened steel, phosphated degreased steel, iron or zinc phosphated steel, Sendzimir galvanized steel, electro-galvanised steel, bath-galvanized steel, cataphoresis treated steel, chromated steel, anodised steel, corundum sandblasted steel, degreased aluminium, smooth or shot-peened aluminium, chromated aluminium, cast iron or any other metal alloy.

As will be clear to the person skilled in the art, the material comprising a metal surface according to the invention is preferably intended for any market for which a metal part is coated.

Thus, the material comprising a metal surface according to the invention is preferably intended:
for the transfer of fluids, particularly in the form of piping, accessories, pumps or valves;
for automobiles, particularly in the form of splined shafts, rails for sliding doors, or springs;
for items made of wires, particularly in the form of dishwasher baskets or springs.

EXAMPLES

1. Materials and Methods
1.1. Compositions
Table 1 below shows the different compositions tested (the data are expressed in parts):

| Constituents: | E1 | E2 | C1 | C2 | C3 |
|---|---|---|---|---|---|
| PA 1 | 1000 | 1100 | 1000 | 1000 | 0 |
| PA 2 | 0 | 0 | 0 | 0 | 750 |
| CoPA | 100 | 0 | 0 | 100 | 250 |
| EVOH 1 | 90 | 90 | 0 | 90 | |
| EVOH 2 | 0 | 0 | 0 | 0 | 80 |
| Antioxidant | 5 | 5 | 5 | 5 | 5 |
| $NaH_2PO_2$ 60% | 8.5 | 8.5 | 8.5 | 8.5 | 0 |
| Anti-cratering additive | 5 | 4 | 5 | 5 | 4 |
| Filler | 70 | 70 | 70 | 70 | 380 |
| Hydrophobing agent | 80 | 80 | 0 | 0 | 0 |

Constituents:
PA 1: polyamide 11 (PA11) Rilsan® (BMNO) (Arkema);
PA 2: polyamide 11 (PA11) Rilsan® (BMNO) (Arkema);
CoPA: PA IPD.10/12 molar ratio 80/20, copolyamide Platamid® (Arkema);
EVOH 1: ethylene vinyl alcohol copolymer comprising 32% mol of ethylene (Evasin 3251F) (Arkema);
EVOH 2: ethylene vinyl alcohol copolymer comprising 44% mol ethylene (Evasin 4405F) (Arkema);)
Bi-functional hindered phenolic antioxidant Palmarole AOOH 98 (Adeka Palmarole);
Polyacrylate-based anti-cratering additive: Byk-360-P (Byk);
Filler: $CaCO_3$ (Atomite, Imerys);
Hydrophobing agent: micronised, amide modified polypropylene wax Ceridust 6721 from Clariant);
E1 and E2 are examples according to the invention.
C1, C2 and C3 are comparative examples. C3 is a composition according to international patent application WO2008/029070.

1.2. Preparation of the Compositions

The constituents are mixed in an extruder at a temperature between 180° C. and 300° C. The mixing time is adapted such that the mixture is homogeneous The mixture is milled in a cryogenically cooled apparatus in order to obtain the desired particle size for application by a fluid bed coating process, i.e., an average diameter (D50) of about 100 μm. The powder particles obtained are selected by screening.

1.3. Coating of a Metal Surface by the Compositions

The compositions are used in a fluid bed dip coating process. Prior to the application of the composition, steel plates measuring 100×100×3 mm are degreased and shot peened. The steel plates are then heated for 10 minutes at 330° C., and then dipped in the fluid bed for 4 seconds. The coated plates are then cooled in ambient air.

1.4. Assessment of the Coating

The metal substrate coating plays a role in protecting the metal against external aggressions. Such protection is only effective if the adhesion to the metal is preserved even when the coating is in prolonged contact with water, which is why an adhesion test after immersion in water is performed.

The abrasion resistance, impact and cathodic disbondment tests are conventional mechanical tests used in various international standards to characterise the aging stability of coatings.

1.4.1. Water Immersion Test

The adhesion of the coating is assessed after immersion in water at different temperatures.

1.4.2. Adhesion Test.

The adhesion test consists of attempting to peel off a strip cut into the coating and assessing the resistance of the adhesion. The test is performed at a temperature of 23° C.±2° C. and relative humidity of 50%±10%.

Using a cutting tool, the coating is cut (down to the metal) along two parallel lines 10 mm apart and over a sufficient length to define a strip at least 30 mm long.

A blade (such as a carpenter's chisel) is introduced beneath the end of the strip; it is gripped by the cut end and an attempt is made to pull it off of the metal support.

A score of from 0 to 4 is given according to the following results:
- 0-No adhesion: the separation of the coating occurs as soon as the cutting tool is used.
- 1-Fair bond: the coating peels off easily, offering only weak resistance to the pull.
- 2-Like score 1, but several strong and regularly distributed sticking points are noted.
- 3-The coating pulls off irregularly: a perfect bond is observed over about 50% of the surface.
- 4-Good adhesion: no peeling; either the blade allows the end of the strip to be pulled up, but the end breaks without additional peeling, or the blade only allows the fragments it cuts to be detached.

1.4.3. Abrasion Test

A Taber abrasion test according to standard ISO 9352 (1000 cycles, Cs-17 under 1 kg) was performed to assess the wear resistance of the coating. The test consists of measuring the mass of abraded coating after 1000 rotation cycles of the Cs-17 grinder wheels, with a weight of 1 kg.

1.4.4. Shock Test

An impact resistance test per standard ASTM G14 was performed: this consists of assessing the mechanical resistance of the coating after dropping a metal ball (diameter and weight defined by the standard) from a certain height, and after the ball falls, assessing the integrity of the coating using a low voltage electrical detector (as described in standard ASTM G62 under the title "Low Voltage Holiday Detector." The result is expressed in Joules.

1.4.5. Cathodic Disbondment Test (Australian Standard).

The test is performed according to standard AS/NZS 4352, using an A or B test cell at 23° C. for 28 days. The test makes it possible to determine the ability of the coating applied to metal substrates to resist cathodic disbondment when the surface coating is likely to have discontinuities.

2. Results 2.1. Water Immersion Test: Assessment of the Adhesion of the Coatings Table 2 below shows the adhesion results:

|  | E1 | E2 | C1 | C2 | C3 |
|---|---|---|---|---|---|
| T0 | 4 | 4 | 4 | 4 | 4 |
| 24 hours water 50° C. | 4 | 3 | 0 | 4 | 4 |
| 24 hours water 70° C. | 4 | 3 | 0 | 3 | 4 |
| 24 hours water 98° C. | — | 2 | — | — | — |
| 4 days water 50° C. | 4 | 3 | 0 | 3 | 4 |
| 14 days water 50° C. | 3 | — | 0 | — | — |
| 21 days water 50° C. | 3 | — | 0 | — | — |
| 4 days water 70° C. | 3 | 1 | 0 | 1 | 4 |

The compositions according to the invention (E1 and E2) were found to have performances similar to those of the prior art (C3) with significantly smaller quantities of filler. The comparison with C1 and C2 establishes that the presence of the hydrophobing agent allows these performances to be explained. The comparison of E2 to E1 shows that the presence of copolyamide with a melting point within the range of 80 to 150° C. in accordance with the invention makes it possible to improve the performances of the compositions according to the invention under the most drastic conditions (immersion for 4 days in water at 70° C.).

2.2. Abrasion Test

An average of 13.3 mg was obtained for E1. The coating therefore has excellent resistance to abrasion, comparable to that of polyamide 11-based coatings. In particular, it makes it possible to comply with various international standards defining the properties of coatings for metal in contact with water, especially drinking water.

2.3. Shock Test

The result was 2.1 J (at 400 μm) for E1. The coating therefore has excellent impact resistance, comparable to that of polyamide 11-based coatings. In particular, it makes it possible to comply with various international standards defining the properties of coatings for metal in contact with water, especially drinking water.

2.4. Cathodic Disbondment Test (Australian Standard)

For this test metal plates measuring 200×100×6 mm, previously shot peened, were used.

They were heated (i) to 300° C. to obtain a coating 380 μm thick and (ii) at 330° C. to obtain a coating 400-450 μm thick.

For E1, 8.2 J was obtained under condition (i) and 4.0 J for condition (ii).

These results indicate that the coating, even when damaged down to the metal, enables the propagation of corrosion to be limited. These results make it possible to meet the requirements of various international standards defining the properties of coatings for metal in contact with water, especially drinking water.

The invention claimed is:

1. A process for coating a metal surface with a composition, comprising the following steps:

heating the metal surface to a temperature high enough for the composition to melt upon contact with the metal surface; and spraying the composition onto the metal surface;

wherein the composition comprises:
- 55 to 98.5 wt % of at least one homopolyamide and/or copolyamide, said copolyamide having a melting point above 150° C., and
- 0.5 to 15 wt % of at least one ethylene vinyl alcohol copolymer, and
- 0.5 to 15 wt % of at least one hydrophobing agent, and
- 0.5 to 15 wt % of at least one copolyamide with melting point within the range of 80 to 150° C., based on the total weight of the composition.

2. The coating process according to claim 1, wherein the composition comprises a homopolyamide selected from the group consisting of PA 10.10, PA11 and PA12.

3. The coating process according to claim 1, the composition comprising:
- 65 to 84 wt % of the at least one homopolyamide and/or copolyamide with melting point above 150° C., and
- 2 to 10 wt % of the at least one ethylene vinyl alcohol copolymer, and
- 2 to 10 wt % of the at least one hydrophobing agent, and
- 2 to 15 wt % of the at least one copolyamide with melting point within the range of 80 to 150° C., based on the total weight of the composition.

4. The coating process according to claim 1, wherein the composition comprises less than 20 wt % of filler, based on the total weight of the composition.

5. The coating process according to claim 1, wherein the hydrophobing agent is a wax.

6. The coating process according to claim 1, wherein the composition does not comprise an epoxide compound.

7. The coating process according to claim 1, wherein the composition further comprises at least one additional agent selected from the group consisting of a pigment, a dye, an anti-cratering and/or anti-spreading agent, an antioxidant, a UV stabilizer, a fluidising agent, a corrosion inhibitor, or mixtures thereof.

8. A process for coating a metal surface with a composition, comprising the following steps:

heating the metal surface to a temperature high enough for the composition to melt upon contact with the metal surface; and spraying the composition onto the metal surface;

wherein the composition comprises:
- 55 to 99 wt % of at least one polyamide,
- 0.5 to 23 wt % of at least one ethylene vinyl alcohol copolymer, and
- 0.5 to 22 wt % of at least one hydrophobing agent based on the total weight of the composition.

9. The coating process according to claim 8, wherein the process further comprises dipping the metal surface into a fluidised bed comprising the composition.

10. The coating process according to claim 8, wherein the process further comprises electrically charging the composition; and wherein the metal surface is connected to a zero potential during the spraying step.

11. The coating process according to claim 8, wherein the process does not include a step in which a coat of adhesion primer is applied to the metal surface prior to contact with the composition.

12. The coating process according to claim 8, wherein the composition is manufactured by a process comprising the following steps:

mixing the constituents of the composition while molten;

milling the mixture after solidification to obtain a powder of particles.

13. The coating process according to claim 12, wherein the powder particles are selected with a particle size of between 5 μm and 1 mm.

* * * * *